United States Patent
Kale et al.

(10) Patent No.: US 8,935,281 B1
(45) Date of Patent: Jan. 13, 2015

(54) OPTIMIZED CONTENT SEARCH OF FILES

(75) Inventors: Sanjay Ramchandra Kale, Pune (IN); Kuldeep Sureshrao Nagarkar, Pune (IN); Abhay Harishchandra Marode, Maharashtra (IN)

(73) Assignee: Symantec Operating Corporation, Mountain View, CA (US)

( * ) Notice: Subject to any disclaimer, the term of this patent is extended or adjusted under 35 U.S.C. 154(b) by 1168 days.

(21) Appl. No.: 11/262,567

(22) Filed: Oct. 31, 2005

(51) Int. Cl.
*G06F 7/00* (2006.01)
*G06F 17/30* (2006.01)

(52) U.S. Cl.
USPC .......................................................... 707/772

(58) Field of Classification Search
USPC ............... 707/2, 3, 6, 772; 711/155, 173, 221
See application file for complete search history.

(56) References Cited

U.S. PATENT DOCUMENTS

| | | | |
|---|---|---|---|
| 5,410,692 A * | 4/1995 | Torres | 707/3 |
| 5,854,916 A | 12/1998 | Nachenberg | 703/21 |
| 5,907,672 A * | 5/1999 | Matze et al. | 714/8 |
| 6,415,300 B1 * | 7/2002 | Liu | 707/204 |
| 6,606,651 B1 | 8/2003 | Linde | 709/216 |
| 6,711,558 B1 * | 3/2004 | Indeck et al. | 707/1 |
| 6,802,028 B1 | 10/2004 | Ruff et al. | 714/38 |
| 2003/0131253 A1 | 7/2003 | Martin et al. | 713/200 |
| 2004/0010732 A1 | 1/2004 | Oka | 714/13 |
| 2004/0078636 A1 | 4/2004 | Suzaki | 714/6 |
| 2004/0107225 A1 * | 6/2004 | Rudoff | 707/204 |
| 2005/0132184 A1 | 6/2005 | Palliyil et al. | 713/152 |
| 2006/0136720 A1 | 6/2006 | Armstrong et al. | 713/164 |
| 2006/0179061 A1 | 8/2006 | D'Souza et al. | 707/10 |

\* cited by examiner

*Primary Examiner* — Fred I Ehichioya
*Assistant Examiner* — Kris Mackes
(74) *Attorney, Agent, or Firm* — Campbell Stephenson LLP

(57) ABSTRACT

A method, system, computer system, and computer-readable medium to search contents of a large number of files. Data are read sequentially from a storage device without using a file system. Physical location information for the files is obtained and used to construct files from the data read. Such physical location information can be obtained, for example, by accessing a file system mapping catalog without causing the file system to read the files. Accessing the mapping catalog can be performed quickly because only metadata is read from the mapping catalog. The constructed files can then be searched for content without the overhead of the file system. Content such as virus signatures and keywords can therefore be discovered much more quickly. Furthermore, because the device is read sequentially, storage locations belonging to more than one file are read only once, further improving the performance of the content search.

17 Claims, 4 Drawing Sheets

OPTIMIZED CONTENT SEARCH OF FILES

BACKGROUND OF THE INVENTION

Global networking of computers has greatly affected business. As the number of computers linked to networks grows, businesses increasingly rely on networks to interact. More and more people use electronic mail, websites, various file transfer methods, and remote office applications, among other types of software, to facilitate business transactions and perform job related tasks. Networks such as the Internet transmit data packets across the network using long-standing addressing technologies and flow control protocols. Historically, these protocols were designed for use on a trusted network and as such do not include many security features. To address this problem, newer protocols are designed to include some security measures. However, at present, the global Internet and many local area networks predominantly use older protocols with various vulnerabilities.

Hackers and malfeasants take advantage of the weaknesses in these protocols to disrupt, infiltrate, or destroy networked devices. In some cases, attackers take advantage of the trusting relationships between computers to infiltrate a network and spread computer instructions that are referred to as a virus. Viruses infect files and use vulnerabilities of programs that interpret the files to propagate. For example, a virus program may be sent to a user as an attachment to an e-mail message. When the user uses his e-mail program to open the attachment, the virus is triggered and uses the e-mail system to propagate to other computer systems within the network. A virus may also function to erase data.

Once a virus infiltrates a network, the virus typically spreads very rapidly, quickly infecting a large number of files and disrupting business operations. In such situations, the time required to discover and repair infected files is often critical. Viruses are typically detected by searching for a virus "signature," which is a pattern of data indicating that a file has been infected. A virus detection program is an application program that searches data on the network to determine whether the virus signature is found in the data. Once infected files are identified, a virus repair application program may be used to repair the infected files.

Most computer systems in which virus detection programs operate use an underlying file system. The file system provides a "layer" of software in the computer system to manage storage space for the files. This layer is between the operating system (which communicates directly with devices) on the computer system hosting the file system and an application program that uses the data in the files. Typically, a searching application, such as the virus detection program described above, calls a read interface provided by the file system to read the files in preparation for performing a search. The searching application provides the name of the file(s) to read, and the file system determines the physical locations on the device(s) storing the files, reads the data from those physical locations, and presents files to be searched to the searching application. The searching application typically then performs the search of the files provided by the file system on a file-by-file basis.

Searching data on a file-by-file basis provides some advantages. For example, data for a given file may be stored in several non-contiguous storage locations on a storage device. The file system handles assembly of the files from the data in these non-contiguous storage locations and provides a copy of the files to the searching application. However, this service comes at a cost, as overhead introduced by the file system in constructing files can significantly affect the time and resources required to perform a search.

Additional overhead is incurred when files share data blocks. For example, backup copies of primary production data may be made periodically to "freeze" images of the data at given points in time. These backup copies can be used to recover from failure of a computer system, storage device, or network. To save storage space, often data that is the same in the primary production data and in the backup copy is stored only once, along with information that will enable the primary data and/or the backup copy to be reconstructed in the event of failure or corruption of the data. Unfortunately, when constructing files as described above, file systems typically do not recognize shared storage locations. Instead, the file system treats the shared storage locations as part of each file, thereby requiring resources to read the shared storage locations once for each file. For file systems managing very large files, this duplicate effort can be very time-consuming and adds overhead to searching of the files.

A solution is needed to enable file content searches to be performed quickly and efficiently, with a minimum amount of duplicate effort. Preferably, the solution can take advantage of existing storage management tools but avoid unnecessary overhead to perform the search.

SUMMARY OF THE INVENTION

The present invention enables content searching of a large number of files to be performed quickly and efficiently. Data are read sequentially from a storage device without using an underlying file system to construct the files. As a result, data can be read from a device very quickly. Physical location information for the files is obtained and used to construct files from the data read. Such physical location information can be obtained, for example, by accessing a file system mapping catalog. Accessing the mapping catalog without using the file system to read the files can be performed very quickly because only metadata is read from the mapping catalog. The files can then be searched for content without the overhead of the file system. Content such as virus signatures can therefore be discovered much more quickly. Furthermore, because the device is read sequentially, storage locations belonging to more than one file are read only once, further improving the performance of the content search.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
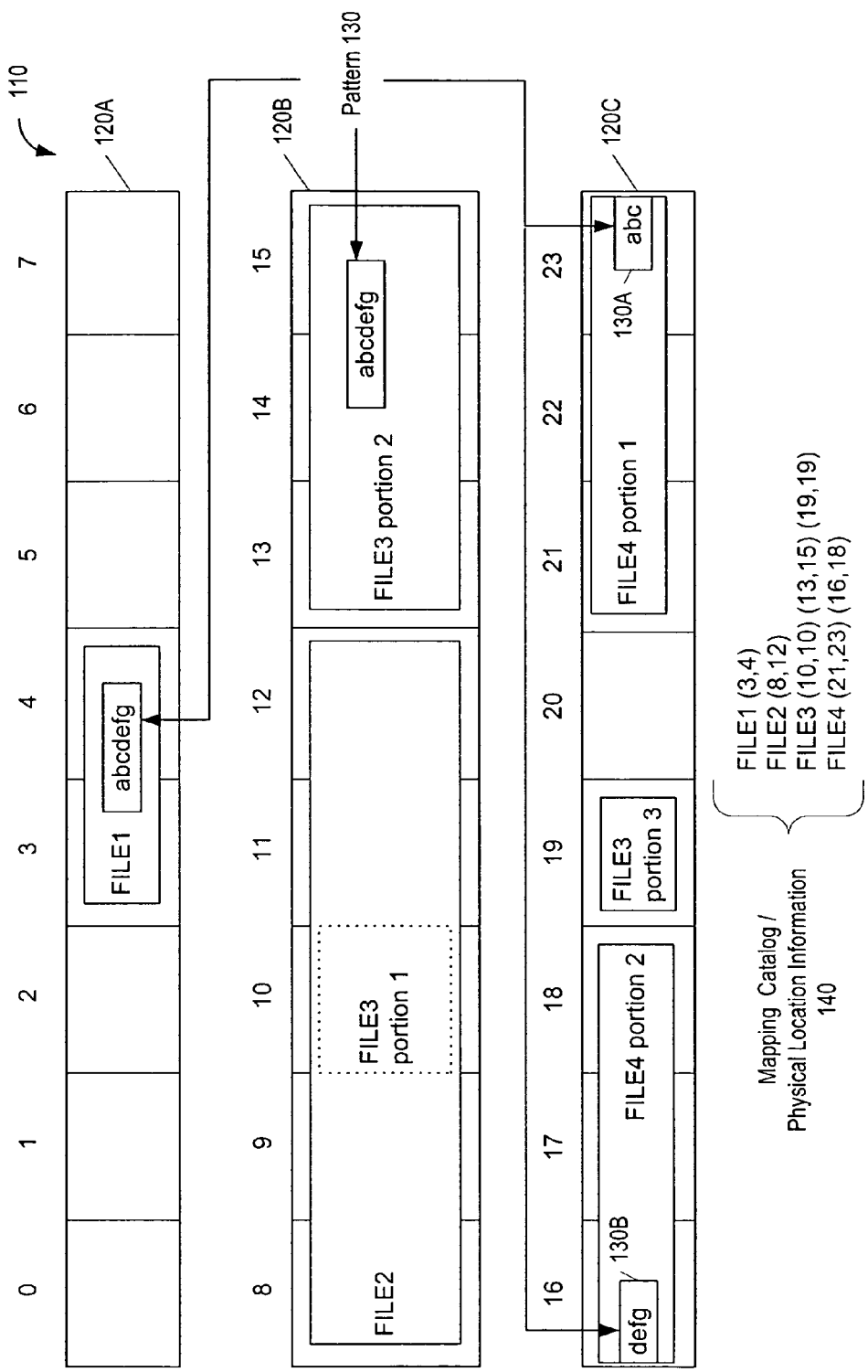
FIG. 1 shows an example of file data stored in a set of contiguous storage locations.

FIG. 1 shows an example of file data stored on a storage device 110. Storage device 110 includes 24 contiguous storage locations, numbered 0 through 23. The number of storage locations shown is for example purposes only, as the description applies to any number of storage locations. Furthermore, the example is not intended to indicate a particular size for a given storage location; different systems may have different units of storage and the example is intended to describe storage locations in general.

In FIG. 1, storage locations 0 through 23 are shown as organized into three contiguous sets, set 120A containing storage locations 0 through 7, set 120B containing storage locations 8 through 15, and set 120C containing storage locations 16 through 23. An application searching for a particular pattern, such as pattern 130 containing the text string 'abcdefg', typically provides the names of files to be searched, and the file system provides those files to the application. The searching application then searches the files for pattern 130.

To manage the files stored on storage device 110, the file system maintains information such as that shown in mapping catalog/physical location information 140. Data are shown for four files named FILE1, FILE2, FILE3, and FILE4. The physical location information for each file is shown as a set of tuples, where each tuple is in the form of (start location, end location). The form of the physical location information for each file may differ between file systems, but a file system provides the functionality to identify storage locations that contain data for a given file. In the example of FIG. 1, FILE1 has data in storage locations 3 and 4, as indicated by tuple (3, 4). Alternatively, physical location information may be represented by a tuple containing a number of contiguous locations beginning with the start location for the respective file. An alternative tuple format of (3, 2) would indicate that two storage locations are part of FILE1 beginning at start location 3. Other formats of mapping catalogs and/or physical location information may also be used.

Referring again to FIG. 1, data for FILE2 are stored in contiguous storage locations 8 through 12 of storage device 110. FILE2 and FILE3 share one storage location, location 10, as shown by the dotted lines for FILE3 portion 1. Sharing a storage location between files is described above with reference to backup copies of data. In addition to storage location 10, the remainder of FILE3 is found in storage locations 13-15 of set 120B (portion 2) and location 19 of set 120C (portion 3). Because a single file may have data in many non-contiguous locations on the storage device, the time to search a file increases with the number of different non-contiguous locations that must be read to construct the file.

In FIG. 1, FILE4 is another example of a file for which data are stored in non-contiguous storage locations. A first portion of FILE4 is found in storage locations 21-23 of set 120C, and a second portion is found in storage locations 16-18 of set 120C. When the first and second portions of FILE4 are combined, pattern 130 appears in the file (as shown by partial patterns 130A and 130B). A search for pattern 130 of all files shown in FIG. 1 shows that pattern 130 (the text string 'abcdefg') is found in FILE1, FILE3, and FILE4.

Figure 2:
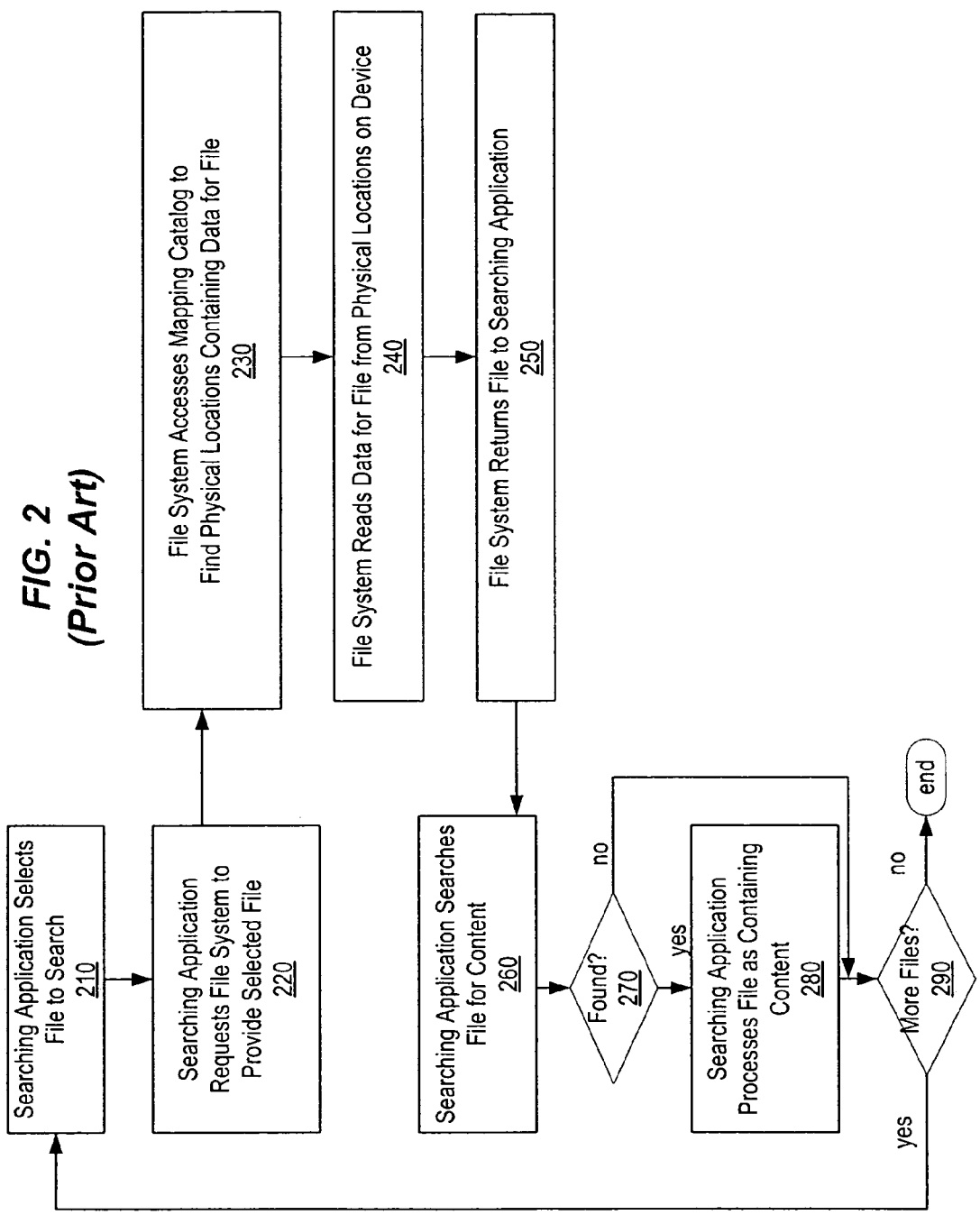
FIG. 2 is a flowchart for a prior art method to search files for a specified pattern of data.

FIG. 2 is a flowchart for a prior art method to search files for a specified pattern of data. In "Searching Application Selects File to Search" step 210, the searching application program selects a file to be searched. While this flowchart is described as processing a single file, one of skill in the art will recognize that the searching application may select several files to be searched at one time. Control transitions to "Searching Application Requests File System to Provide Selected File" step 220, where a request is sent by the searching application for the file(s) to the file system. Control then transitions to the file system for performing steps 230 through 250.

In "File System Accesses Mapping Catalog to Find Physical Locations Containing Data for File" step 230, the file system accesses its mapping catalog, such as the mapping catalog/physical location information 140 of FIG. 1, to find the physical locations on the device for the requested file(s). Control transitions to "File System Reads Data for File from Physical Locations on Device" step 240, where the file system reads data from the physical locations indicated. In performing the read operation, the file system may read more than one set of non-contiguous storage locations to obtain all data for the file. A file system performs read operations one file at a time. In the example of FIG. 1, to read FILE1, locations 3 and 4 would be read. To read FILE2, locations 8 through 12 would be read. To read FILE3, storage location 10 would be read (despite the fact that storage location 8 has already been read in constructing FILE2). Storage locations 13-15 would be read from locations 13-15, and storage location 19 also would be read. To read FILE4, storage locations 21 through 23 would be read, followed by storage locations 16-18. The read operations for FILE3 and FILE4 are not sequential read operations, but instead skip from one storage location to another to find data for the particular file being read. For sequential storage devices such as tapes, such read operations incur significant file system overhead.

Referring again to FIG. 2, from "File System Reads Data for File from Physical Locations on Device" step 240, control transitions to "File System Returns File to Searching Application" step 250, where the file system returns the data in the form of a file to the searching application program. Communication of a large file from the file system to the searching application also incurs significant resources.

In "Searching Application Searches File for Content" step 260, control returns to the searching application. Contents of the file are searched for the data pattern of interest in the file, such as a virus signature or keyword. Control then transitions to "Found?" decision point 270, where the searching application determines whether the specific content for which the search is being performed has been found.

At "Found?" decision point 270, if the pattern that is the subject of the search has been found, control transitions to "Searching Application Processes File as Containing Content" step 280. The searching application then processes the file as containing the content that was the subject of the search. For example, if the content that is the subject of the search is a virus signature, a virus detection application may pass the file to a virus repair program that repairs the infected file. Control then transitions to "More Files?" decision point 290. At "More Files?" decision point 290, if files remain to be searched, control returns to "Searching Application Selects File to Search" step 210, where another file is selected to be searched.

At "Found?" decision point 270, if the content that was the subject of the search was not found in the file, control continues to "More Files?" decision point 290. At "More Files?" decision point 290, if no files remain to be searched, the searching application has completed the search and the process ends.

In FIG. 2, steps 210 and 220 are performed by the searching application, and then control passes to the file system. The file system performs steps 230 through 250 and returns the file to the searching application. Control then returns to the searching application to perform the actual search. As noted above, the overhead incurred by the file system to read data on a file-by-file basis can significantly affect the time required to perform a search.

Figure 3:
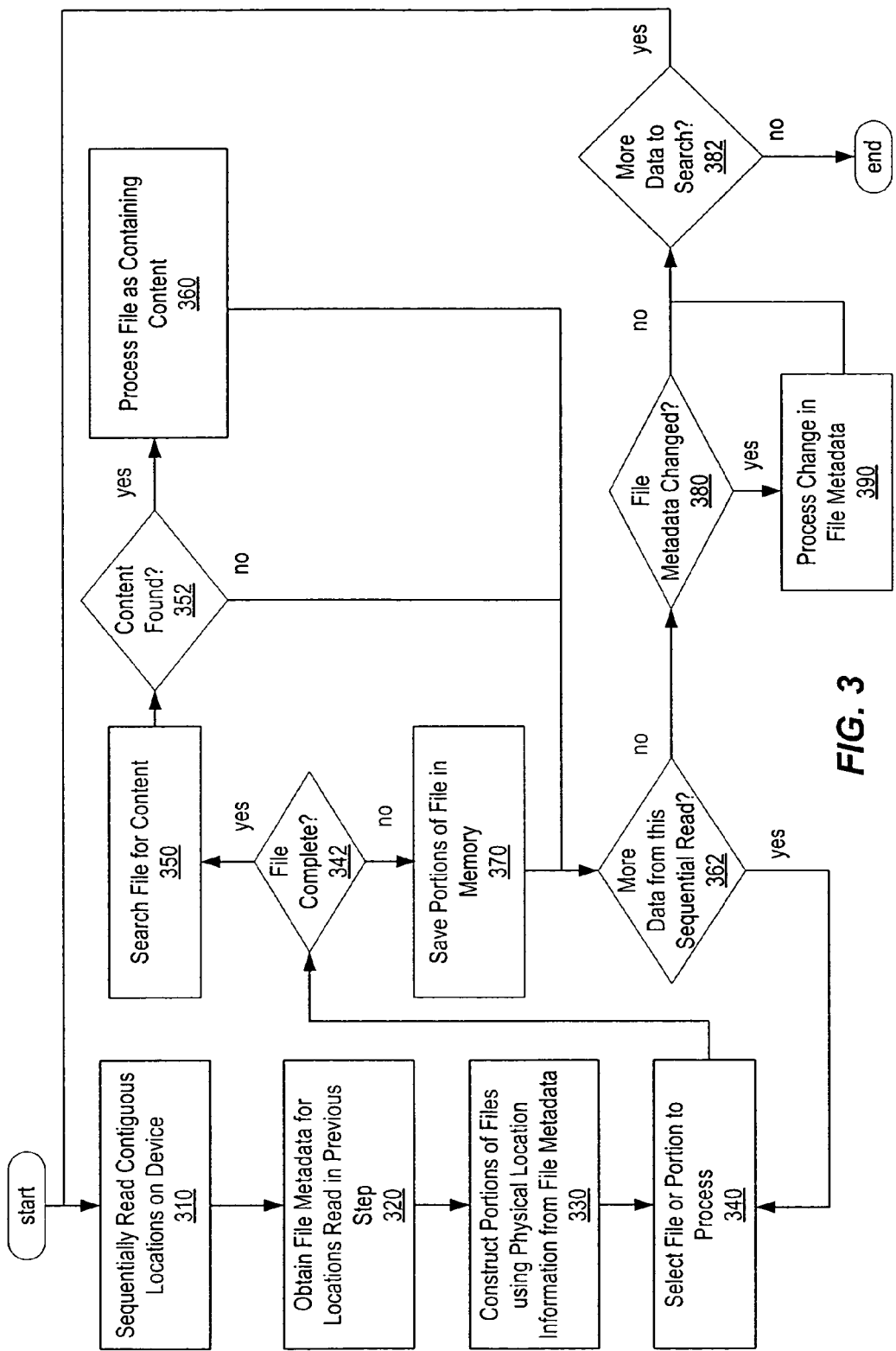
FIG. 3 is a flowchart of a method to search files for a specified pattern of data in accordance with one embodiment of the invention.

FIG. 3 is a flowchart of a method to search files for a specified pattern of data in accordance with one embodiment of the invention. In this embodiment, the searching application, rather than the file system, reads data directly from the device and constructs the files. In the description below, the term "searching application" is used to encompass searching instructions, module(s), or means that search for particular content in one or more files. The steps of the flowchart of FIG. 3 are considered to be performed by a searching application, module(s), instructions, or means rather than the file system. FIG. 3 is described with reference to the data shown in FIG. 1, including storage device 110; the sets of contiguous locations 120A, 120B, and 120C; files FILE1, FILE2, FILE3, and FILE4; pattern 130 (containing the text string 'abcdefg' for illustrative purposes); and the mapping catalog/physical location information 140.

Referring to FIG. 3, in "Sequentially Read Contiguous Locations on Device" step 310, the searching application reads a set of contiguous locations from the storage device. This reading may be performed by a reading module, instructions, or means to sequentially read a set of contiguous storage locations of a storage device. Rather than first identifying the files to be read via the file system, a sequential read operation is performed on the "raw" device. Such a sequential read operation is much faster than waiting for the file system to construct and return the file. In the example shown in FIG. 1, each set of contiguous storage locations includes eight storage locations. Therefore, three sequential read operations are performed to read the storage locations in numerical order from 0 to 23. In the example described, the set of storage locations 120A is read first, followed by set of storage locations 120B, and then set of storage locations 120C.

At the time of preparing to perform a sequential read operation, the searching application may have no information about the data files that are being read. Instead, the searching application may use other information to identify a start and end location from which to read sequentially. Examples of such information are a buffer size in memory or processing power available. Alternatively, the searching application may read only storage locations containing data from the first location containing data until the searching application encounters an empty storage location. Other techniques for determining or identifying a set of contiguous storage locations to read are within the scope of the invention.

After reading data from the set of contiguous storage locations, control transitions to "Obtain File Metadata for Locations Read in Previous Step" step 320. The term "metadata" is used to describe "data about data;" in this case, file metadata is data about the files but not the data contained within the files. In one embodiment, the searching application obtains metadata such as identifiers for files having data in the contiguous locations that were read. The searching application also obtains physical location information indicating storage locations containing each portion of each file. The searching application may use obtaining instructions, module(s), or means to obtain physical location information for portions of a plurality of files stored in the set of contiguous storage locations on the storage device. An example of one technique for obtaining the file metadata is described in further detail with reference to FIG. 4 below.

From "Obtain File Metadata for Locations Read in Previous Step" step 320, control transitions to "Construct Portions of Files using Physical Location Information from File Metadata" step 330. Because the searching application read the data sequentially rather than using information about the files being read, the contents of some of the files may be incomplete. With the example files of FIG. 1, the sequential read operations of the sets of storage locations 120A and 120B provide the entire contents of respective files FILE1 and FILE2. However, the sequential read operation of the set of storage locations 120B provides only the first and second portions of FILE3. The term "portion" of a file indicates some, but not all, of the data contents of the file. Construction of a file may be performed by using instructions, module(s), or means that use the physical location information to construct a first file from the portions of the plurality of files. Handling of partial or incomplete files is described in further detail below.

Because data are read directly and sequentially from storage device 110, storage location 10 is read only once, even though storage location 10 includes data for both FILE2 and FILE3. For systems having data that may be stored in non-contiguous storage locations, avoiding the duplicate effort of reading shared storage locations more than once can provide significant savings. In the example of FIG. 1, after reading both sets of contiguous storage locations 120A and 120B, FILE1 and FILE2 are complete files, but FILE3 is incomplete. The portions of incomplete FILE3 that have already been read can be stored in memory until the remaining portions of the file are processed as part of a subsequent sequential read operation.

In a sequential read operation of the set of contiguous storage locations 120C, the remaining portion of FILE3 is found. FILE3 can then be constructed in memory by concatenating copies of portions 1 and 2 that were stored in memory with the data for portion 3 of FILE3. Data for FILE4 have also been read. Because the data for FILE4 are stored non-contiguously and out of order on the storage device, the sequential read operation of locations 16-23 reads data for FILE4 portion 2 prior to the data for FILE4 portion 1. When the first and second portions of FILE4 are concatenated, pattern 130 appears.

After "Construct Portions of Files using Physical Location Information" step 330, at least one portion of at least one file is available for searching. Control transitions to "Select File or Portion to Process" step 340, where the searching application selects a file or a portion from among the files and/or portions that were read in the most recent sequential read operation. When the selection is made, control transitions to "File Complete?" decision point 342, where a determination is made whether the selected file is complete. In one embodiment, a file is considered to be complete if the contents of all of its portions have been read, as indicated by the file's metadata from mapping catalog/physical location information 140. If some, but not all, of the data for only one file has been read, that single file is not considered to be complete. The portion of the file can be saved and another read operation will be necessary to obtain the remaining portions of the file.

At "File Complete?" decision point 342, if the selected file is complete, control transitions to "Search File for Content" step 350. The file is searched for the content of interest (in our example, the text pattern 'abcdefg'). This searching may be performed by searching instructions, module(s), or means for searching the file for a pattern or keyword that is the content of interest. At "Content Found?" decision point 352, if the content has been found in the selected file, control transitions to "Process File as Containing Content" step 360. The processing performed in "Process File as Containing Content" step 360 is specific to the content of interest and the type of search being performed. For example, a virus detection searching application may process a file by passing the file identifier to a virus repair application that can repair the file. A keyword searching application may process a file by passing the file identifier to a keyword processing application.

At "Content Found?" decision point 352, if the content is not found in the selected file, control transitions to "More Data from this Sequential Read?" decision point 362. If data read in step 310 remain to be processed, control returns to "Select File or Portion to Process" step 340 to select another file or portion to process. If no data from the most recent sequential read operation performed in step 310 remains to be processed, control continues from "More Data from this Sequential Read?" decision point 362 to "File Metadata Changed?" step 380.

At "File Metadata Changed?" decision point 380, a determination is made whether the metadata for any portion of the selected file has changed after that file's metadata was obtained. Metadata for a file may change for many reasons. For example, different sequential read operations may read different portions of the selected file. These different read operations result in different iterations of the "Obtain File Metadata for Locations Read in Previous Step" step 320. Consequently, the selected file's physical location information for one or more portions of the file may have changed after metadata for other portions of the selected file were obtained.

At "File Metadata Changed?" decision point 380, if the file metadata have changed, control can transfer to "Process Change in File Metadata" step 390. Processing a change can involve, for example, identifying the files that were subject to write operations that changed the files' metadata. Such information may be provided by, for example, backup instructions that track changes to primary data after a backup copy is made. The storage locations for only files having changed metadata can then be re-read, and the changed files can be reconstructed and searched again.

After performing "Process Change in File Metadata" step 390, control continues to "More Data to Search" decision point 382. "More Data to Search" decision point 382 may also be reached when a determination is made that the selected file's metadata have not changed in "File Metadata Changed?" decision point 380. Having processed all of the files relevant to the sequential read operation performed in the most recent iteration of "Sequentially Read Contiguous Locations on Device" step 310, control continues to "More Data to Search" decision point 382.

At "More Data to Search?" decision point 382, a determination is made whether additional data not yet read are stored on the device of interest. If all desired storage locations of the device have not been searched, control returns to "Sequentially Read Contiguous Locations on Device" step 310, where another set of contiguous storage locations is read sequentially from the device.

Referring back to "File Complete?" decision point 342, if the selected file is not complete (e.g., all portions of the file have not yet been read as of the most recent iteration of step 310), control continues to "Save Portions of File in Memory" step 370. The already-read portions of the file are saved so that they can be combined with the remaining portions when those portions subsequently are sequentially read from the device. Control then continues to "More Data from this Sequential Read?" decision point 362 and continues as described above.

Figure 4:
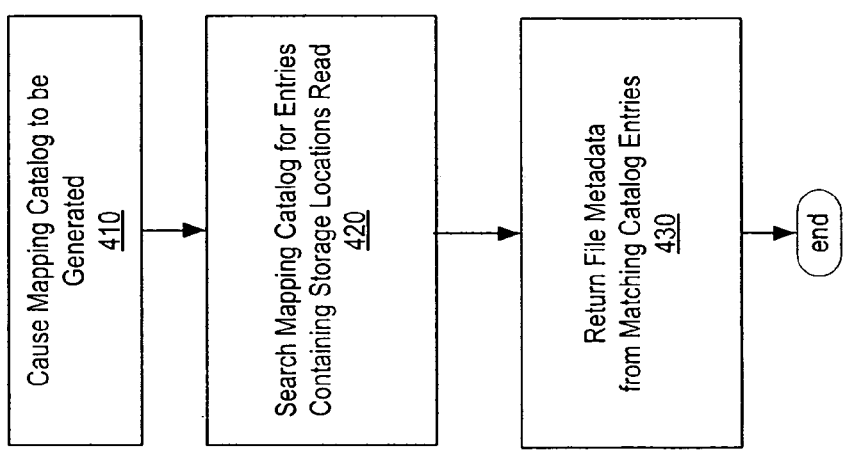
FIG. 4 describes a method to obtain file metadata for the storage locations from which data were read in the "Sequentially Read Contiguous Locations on Device" step of the flowchart of FIG. 3 in accordance with one embodiment of the invention.

FIG. 4 describes a method to obtain file metadata for the storage locations from which data were read in the "Sequentially Read Contiguous Locations on Device" step 310 of FIG. 3. Because the storage locations were read sequentially without the help of the file system, the searching application has no information about the files to which the data belong. In one embodiment, the searching application obtains the file metadata via an intermediate application, such as a volume manager or other software in communication with the file system. Examples of intermediate applications that the searching application can use are provided by Veritas Operating Corporation of Mountain View, Calif., and include Veritas Volume Management System and Veritas Mapping Service used in conjunction with Veritas Volume Snapshot Provider or the Veritas Net Backup product.

Upon a request for file metadata, the intermediate application can cause a new mapping catalog to be generated, as shown in "Cause Mapping Catalog to be Generated" step 410. One technique for causing a mapping catalog to be generated is described further with reference to FIG. 5 below. In FIG. 4, after causing the mapping catalog to be generated, control transitions to "Search Mapping Catalog for Entries Containing Storage Locations Read" step 420. For example, consider the situation after reading the first set of contiguous storage locations 120 in FIG. 1, in this case, locations 0 through 7. Any tuple in the mapping catalog that has a physical location ranging from 0 through 7 would be identified. Only the first tuple (3,4) for FILE1 has physical location information that falls into the range from 0 through 7. Therefore, after searching the mapping catalog, only the first entry for FILE1 would be found.

After identifying the mapping catalog entries of interest in "Search Mapping Catalog for Entries Containing Storage Locations Read" step 420, control continues to "Return File Metadata from Matching Catalog Entries" step 430. In the example above, only file metadata for FILE1 would be returned. When the file metadata for the selected file are returned to the searching application, processing of the "Obtain File Metadata for Locations Read in Previous Step" step 320 of FIG. 3 is completed. Control returns to begin execution of the "Construct Portions of Files using Physical Location Information from File Metadata" step 330 of FIG. 3.

Continuing the example of FIG. 4, after the set of contiguous storage locations 120B is searched, catalog entries for FILE2 and FILE3 are identified and file metadata for both FILE2 and FILE3 is returned. After the set of contiguous storage locations 120C is searched, catalog entries for FILE4 and FILE3 are identified and file metadata for both FILE4 and FILE3 is returned.

Figure 5:
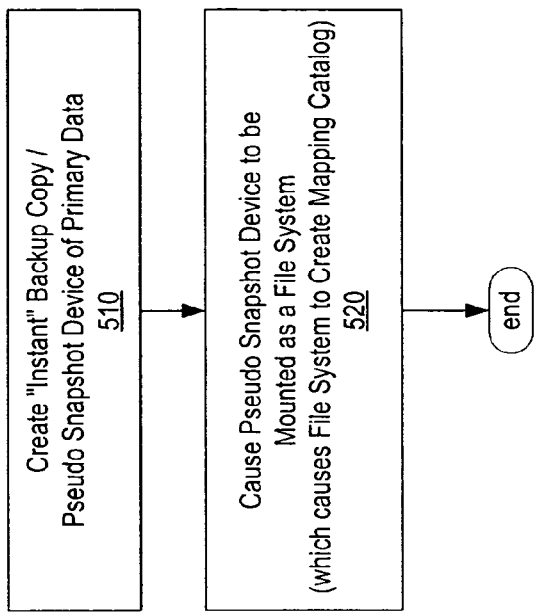
FIG. 5 is a flowchart of one embodiment of a method to perform the "Cause Mapping Catalog to be Generated" step of the flowchart of FIG. 4.

FIG. 5 is a flowchart of one embodiment of a method to perform the "Cause Mapping Catalog to be Generated" step 410 of FIG. 4. One way to cause a new mapping catalog to be generated is to create an "instant" backup copy of the primary data. Creation of the instant backup copy occurs in "Make 'Instant' Backup Copy/Pseudo-Snapshot Device of Primary Data" step 510. Creation of the instant backup copy is created may be performed by an intermediate application, such as Veritas Snapshot Provider or Veritas Net Backup, or by another vendor's backup application. At the point in time that the "instant" backup copy is created, all data in the backup copy are identical to the primary data. Consequently, all data blocks can be considered to be shared and none of the file contents need be copied to the backup copy, thereby creating the backup copy "instantly."

The resulting instant backup copy can be treated as any other storage device, including being mounted as a device by the file system. Mounting a device involves initializing the device to store files for the file system. Consequently, the instant backup copy may be referred to as a "pseudo-snapshot device." In "Cause Pseudo-Snapshot Device to be Mounted by the File System (which causes the File System to Create a Mapping Catalog for the Pseudo-Snapshot Device)" step 520, the intermediate application may request the file system to mount the pseudo-snapshot device. At this point in time, with all data blocks being shared, the mapping catalog for the backup copy and the primary data can be considered to contain the same physical location information. Consequently, the mapping catalog can be generated very quickly. In one embodiment, the mapping catalog is generated by a mapping service, which uses the mounted file system to map the files to the device.

Mounting the pseudo-snapshot device results in the creation of a new mapping catalog by the file system for the pseudo-snapshot device. The new mapping catalog identifies files and the physical location information for those files on the pseudo-snapshot device. Initially, the newly-created mapping catalog includes the same physical location information as the existing mapping catalog for the primary data. Consequently, creation of the new mapping catalog does not require reading actual file contents and can be performed very quickly. The physical location information for the files can then be compared to the storage locations sequentially read in "Sequentially Read Contiguous Locations on Device" step 310 to identify the files to which the data belongs.

In the embodiment of FIG. 5, the file system is not requested to provide the file or to read any of the files' contents. All that is requested of the file system is to mount the pseudo-snapshot device. As a result of mounting the device, the file system can cause the mapping catalog to be generated for the pseudo-snapshot device. In one embodiment, the file system uses a mapping service (Veritas. File System (VxFS) uses Veritas Mapping Service (VxMS)) to map the files to the device and generate the mapping catalog. Causing the file system to mount the pseudo-snapshot device is a much faster operation than having the file system use an existing mapping catalog to read the data from the device on a file-by-file basis. This performance improvement is particularly true for files having data stored in several non-contiguous storage locations.

In this embodiment, the file system only needs to be mounted for a short period of time while the data are sequentially read and the file metadata accessed. Files can be constructed using the file metadata. When a set of contiguous storage locations has been read and searched and it is confirmed that the file metadata have not changed, the file system can be dismounted.

The present invention provides many advantages. Because data are read without the overhead of a file system, large amounts of data can be read from a device much more quickly. Content such as virus signatures or keyword matches can therefore be discovered much more quickly. Furthermore, because the device is read sequentially, storage locations belonging to more than one file are read only once, further improving the performance of the content search.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    sequentially reading a set of contiguous storage locations of a storage device;
    obtaining physical location information for portions of a plurality of files stored in the set of contiguous storage locations on the storage device;
    storing at least one of the portions corresponding to a first file, in response at least in part to detecting that the first file is incomplete, wherein
        the detecting is based at least in part upon the physical location information, and
        the storing is performed subsequent to the sequentially reading the set of contiguous storage locations;
    searching a second file of the plurality of files for a pattern, in response at least in part to detecting that the second file is complete, wherein
        the detecting is based at least in part upon the physical location information, and
        the searching the second file is performed subsequent to the sequentially reading the set of contiguous storage locations;
    sequentially reading a second set of contiguous storage locations, wherein
        the sequentially reading the second set of contiguous storage locations is performed subsequent to the storing the at least one of the portions and
        subsequent to the searching the second file, and
        the second set of contiguous storage locations store second portions of one or more of the plurality of files;
    constructing the first file from the stored at least one of the portions and at least one of the second portions, wherein
        the constructing is based at least in part upon the physical location information; and
    searching the first file for the pattern, wherein
        the searching the first file is performed in response at least in part to the constructing the first file.

2. The method of claim 1, wherein
at least two files of the plurality of files do not share a data block.

3. The method of claim 1, wherein
the plurality of files includes a third file that shares a shared data block on the storage device with the first file.

4. The method of claim 3 further comprising:
constructing the third file;
searching the third file for the pattern, wherein
    the searching the third file and the searching the first file comprises searching the shared data block only once.

5. The method of claim 1, wherein
the obtaining the physical location information comprises
    causing a mapping catalog to be generated; and
    searching the mapping catalog for an entry containing one location of the set of contiguous locations; and
    providing a file identifier and the physical location information from the entry.

6. The method of claim 5, wherein
the causing the mapping catalog to be generated comprises
    making a copy of primary data; and
    causing the copy of the primary data to be mounted as a device by a file system.

7. A system comprising:
a storage device;
reading means for sequentially reading a set of contiguous storage locations of the storage device;
obtaining means for obtaining physical location information for portions of a plurality of files stored in the set of contiguous storage locations on the storage device;
storing means for storing at least one of the portions corresponding to a first file, in response at least in part to detecting that the first file is incomplete, wherein
    the detecting is based at least in part upon the physical location information, and
    the storing is performed subsequent to the sequentially reading the set of contiguous storage locations;
searching means for searching a second file of the plurality of files for a pattern, in response at least in part to detecting that the second file is complete, wherein
    the detecting is based at least in part upon the physical location information, and
    the searching the second file is performed subsequent to the sequentially reading the set of contiguous storage locations;
reading means for sequentially reading a second set of contiguous storage locations, wherein
    the sequentially reading the second set of contiguous storage locations is performed subsequent to the storing the at least one of the portions and subsequent to the searching the second file, and
    the second set of contiguous storage locations store second portions of one or more of the plurality of files;
using means for using the physical location information for constructing Hall the first file from the stored at least one of the portions and at least one of the second portions; and
searching means for searching the first file for the pattern, wherein
    the searching the first file is performed in response at least in part to the constructing the first file.

8. The system of claim 7 further comprising:
constructing means for constructing a third file, wherein
    the third file shares a shared data block with the first file;

second searching means for searching the third file for the pattern, wherein
searching the third file and searching the first file comprises searching the shared data block only once.

9. An apparatus comprising:
a storage device;
a reading module to sequentially read a set of contiguous storage locations of the storage device and to sequentially read a second set of contiguous storage locations of the storage device;
an obtaining module to obtain physical location information for portions of a plurality of files stored in the set of contiguous storage locations on the storage device and for second portions of one or more of the plurality of files stored in the second set of contiguous storage locations;
a searching module to search a first file of the plurality of files for a pattern, in response at least in part to detecting that the first file is complete, wherein
the detecting is based at least in part upon the physical location information, and
the search of the first file is performed subsequent to the set of contiguous storage locations being sequentially read;
a construction module to store at least one of the portions corresponding to a second file, in response at least in part to detecting that the second file is incomplete, wherein
the detecting is based at least in part upon the physical location information,
the at least one of the portions is stored subsequent to sequentially reading the set of contiguous storage locations and prior to sequentially reading the second set of contiguous storage locations,
the construction module is further configured to construct the second file from the stored at least one of the portions and at least one of the second portions of the plurality of files,
the construction of the second file is based at least in part upon the physical location information, and
the construction of the second file is performed subsequent to sequentially reading the second set of contiguous storage locations and to searching the first file; and
a searching module to search the second file for the pattern, wherein
the search of the second file is performed in response at least in part to construction of the second file.

10. The apparatus of claim 9 further comprising:
a constructing module to construct a third file, wherein
the third file shares a shared data block on the storage device with the second file; and
a searching module to search the third file for the pattern, wherein
searching the third file and searching the second file comprises searching the shared data block only once.

11. The apparatus of claim 9 further comprising:
a causing module to cause a mapping catalog to be generated; and
a searching module to search the mapping catalog for an entry containing one location of the set of contiguous locations; and
a providing module to provide a file identifier and the physical location information from the entry.

12. The apparatus of claim 11 wherein the causing module comprises
a making module to make a copy of primary data; and
a causing module to cause the copy of the primary data to be mounted as a device by a file system.

13. A computer-readable medium comprising:
reading instructions operable to sequentially read a set of contiguous storage locations of a storage device;
obtaining instructions operable to obtain physical location information for portions of a plurality of files stored in the set of contiguous storage locations on the storage device;
searching instructions operable to search a first file of the plurality of files for a pattern, in response at least in part to detecting that the first file is complete, wherein
the detecting is based at least in part upon the physical location information, and
the search of the first file is performed subsequent to sequentially reading the set of contiguous storage locations;
storing instructions operable to store at least one of the portions corresponding to a second file, in response at least in part to detecting that the second file is incomplete, wherein
the detecting is based at least in part upon the physical location information, and
the at least one of the portions is stored subsequent to sequentially reading the set of contiguous storage locations;
reading instructions operable to sequentially read a second set of contiguous storage locations, wherein
the second set of contiguous storage locations is sequentially read subsequent to storing the at least one of the portions and subsequent to searching the first file, and
the second set of contiguous storage locations store second portions of one or more of the plurality of files;
constructing instructions operable to construct the second file from the stored at least one of the portions and at least one of the second portions, wherein
the construction of the second file is based at least in part upon the physical location information; and
searching instructions operable to search the second file for the pattern, wherein
the searching the first file is performed in response at least in part to construction of the second file.

14. The computer-readable medium of claim 13 further comprising:
constructing instructions operable to construct a third file, wherein
the third file shares a shared data block on the storage device with the second file;
second searching instructions operable to search the third file for the pattern, wherein
searching the third file and searching the second file comprises searching the shared data block only once.

15. The computer-readable medium of claim 13 further comprising:
causing instructions operable to cause a mapping catalog to be generated; and
searching instructions operable to search the mapping catalog for an entry containing one location of the set of contiguous locations; and
providing instructions operable to provide a file identifier and the physical location information from the entry.

16. The computer-readable medium of claim 15 wherein the causing instructions comprise
making instructions operable to make a copy of primary data; and
second causing instructions operable to cause the copy of the primary data to be mounted as a device by a file system.

17. A computer system comprising:
a processor for executing instructions; and
a memory storing instructions executable by the processor to:
sequentially read a set of contiguous storage locations of a storage device;
obtain physical location information for portions of a plurality of files stored in the set of contiguous storage locations on the storage device;
store at least one of the portions corresponding to a first file, in response at least in part to detecting that the first file is incomplete, wherein
   the detecting is based at least in part upon the physical location information, and
   the at least one of the portions corresponding to the first file is stored subsequent to sequentially reading the set of contiguous storage locations;
search a second file of the plurality of files for a pattern, in response at least in part to detecting that the second file is complete, wherein
   the detecting is based at least in part upon the physical location information, and
   the second file is searched subsequent to the sequentially reading the set of contiguous storage locations;
sequentially read a second set of contiguous storage locations, wherein
   the second set is sequentially read subsequent to storing the at least one of the portions and subsequent to searching the other file, and
   the second set of contiguous storage locations store second portions of one or more of the plurality of files;
construct hail the first file from the stored at least one of the portions and at least one of the second portions, wherein
   the construction of the first file is based at least in part upon the physical location information; and
search the first file for the pattern, wherein
   the first file is searched in response at least in part to construction of the first file.

* * * * *